United States Patent [19]
Goff et al.

[11] 3,887,028
[45] June 3, 1975

[54] STEERING SYSTEM

[75] Inventors: Raymond L. Goff; Jim L. Rau, both of Lafayette, Ind.

[73] Assignee: TRW Inc., Cleveland, Ohio

[22] Filed: Feb. 25, 1974

[21] Appl. No.: 445,209

[52] U.S. Cl.............. 180/79.2 R; 60/384; 91/411 R
[51] Int. Cl.............................................. B62d 5/08
[58] Field of Search ................ 180/79.2 R, 79.2 B; 60/384, 471, 472, 484, 486; 91/411 R

[56] References Cited
UNITED STATES PATENTS

| | | | |
|---|---|---|---|
| 3,065,602 | 11/1962 | Curlett | 60/471 |
| 3,482,398 | 12/1969 | Christensen | 91/411 R |
| 3,509,958 | 5/1970 | Lang | 60/384 X |
| 3,572,460 | 3/1971 | Berlich | 60/384 X |

*Primary Examiner*—David Schonberg
*Assistant Examiner*—John A. Pekar

[57] ABSTRACT

A steering system comprises a pair of fluid actuators connected to effect turning of wheels of a vehicle when actuated. Each of the actuators is a cylinder divided into two fluid chambers of unequal volume by a piston. Fluid flow into certain chambers of each cylinder effects steering in one direction and fluid flow into the other chambers of each cylinder effects steering in another direction. Respective fluid controllers are associated with each of the cylinders. Each of the fluid controllers comprises a valve for directing fluid selectively to one of the two chambers of the cylinder with which the controller is associated and for receiving fluid from the other chamber of the cylinder, and metering means for metering the flow of fluid to the chambers. Differential actuation of the fluid controllers provides for the proper flow rates to the cylinder chambers.

13 Claims, 7 Drawing Figures

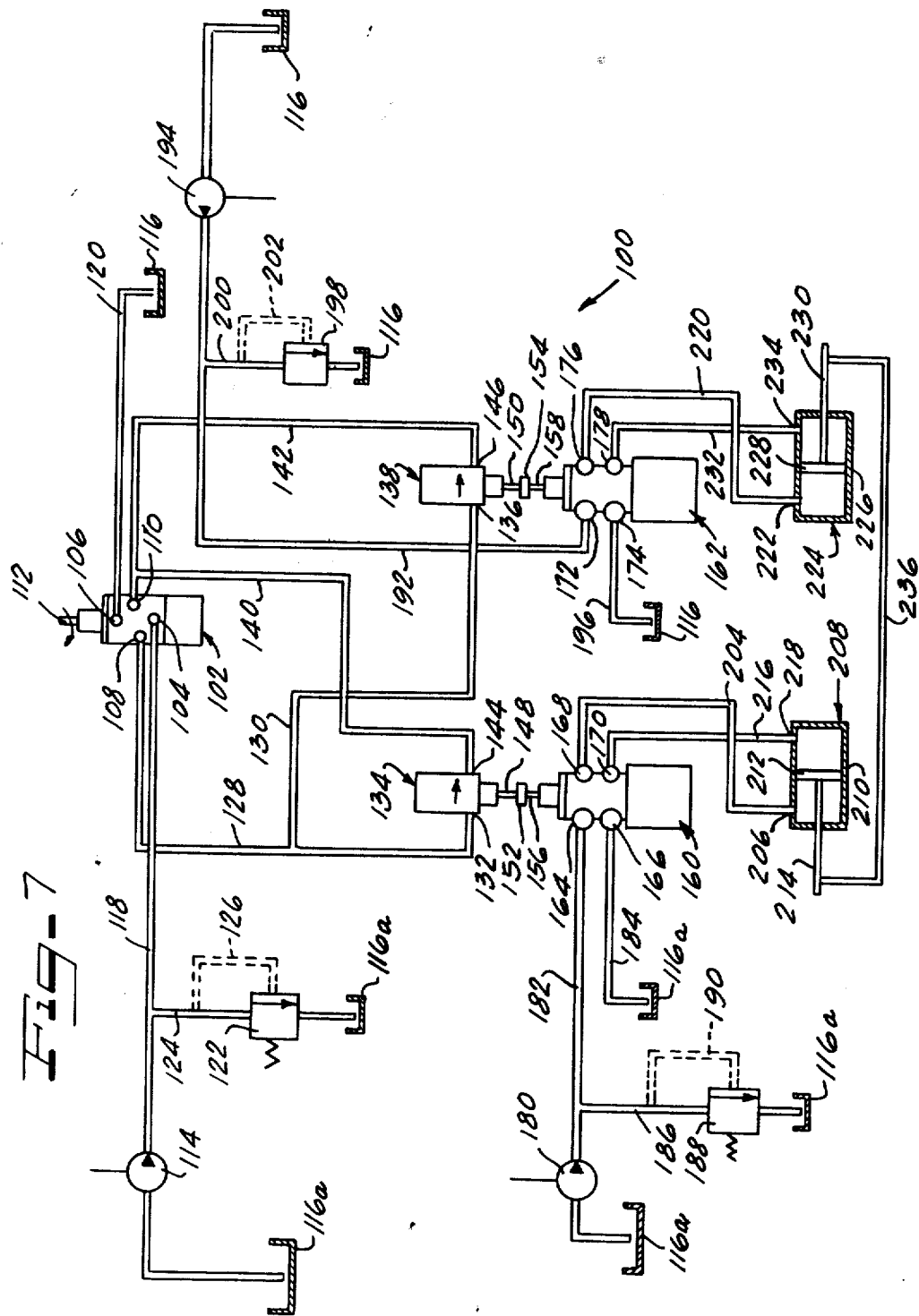

STEERING SYSTEM

BACKGROUND OF THE INVENTION

This invention generally relates to the field of hydraulic control systems, and is more particularly concerned with a hydrostatic steering system.

A conventional hydrostatic steering system involves the use of a metering mechanism, commonly of the gerotor type, for metering fluid flow to a cylinder which effects the turning of the wheels of the vehicle and a valve for directing the metered flow to the cylinder. It is common in such systems that in the event of a failure in the supply pump for the system, manual turning of the steering wheel will effect operation of the gerotor metering mechanism as a pump and thereby steering can still be effected, even though the supply pump is inoperative.

In the application of such hydrostatic steering controls to heavy duty vehicles, it is, of course, desirable to provide proper steering control with low steering effort. In addition, it is necessary to provide a high flow capability in the system. Furthermore, proper follow-up action must be provided as in all practical steering systems. Further in achieving the above, it is desirable to use production components as well as to provide for safety in the steering system so that the vehicle may still be steered in the event of failure of certain components. The present invention provides the above advantages.

Systems generally directed to the above are shown in U.S. Pat. Nos. 3,482,398 and 3,730,288. Such systems include, as is common, unbalance steering cylinders, that is, cylinders which require one flow rate for steering in one direction and a different flow rate for steering in the opposite direction. Because of these different flow rate requirements, such systems have involved cross plumbing between the cylinders. In addition, in the event of certain failures in these systems, steering could still be effected in opposite directions at the same steering ratio.

SUMMARY OF THE PRESENT INVENTION

The present invention comprises a practical hydrostatic steering system applicable to the steering of heavy duty vehicles. In particular, the present invention utilizes production components and also provides a steering system where the vehicle may be steered, even though parts of the system may become damaged and inoperative.

In general, the present invention provides a vehicle steering system which, in effect, includes two independent fluid systems which, when actuated, either simultaneously or individually, will effect vehicle steering. During normal steering, both fluid systems are actuated to provide for proper steering action of the vehicle. However, in the event of certain damage or inoperativeness of one of the systems, steering of the vehicle can still be effected due to the fact that the other fluid system is still operative.

More specifically, the steering system involving the present invention includes a pair of fluid cylinders which, when actuated, effect vehicle steering. The respective cylinders are part of each completely independent fluid system, so that if one system is inoperative, the other system may still be operative to effect vehicle steering by actuation of one of the cylinders.

The steering system embodying the present invention comprises a pair of fluid cylinders connected to effect turning of wheels of a vehicle when actuated. Each of the cylinders is divided into two fluid chambers of different volume, i.e., unbalanced cylinders. Fluid flow into certain chambers of each actuator effects steering in one direction and fluid flow into the other chambers of each actuator effects steering in another direction. Respective fluid controllers are associated with each of said fluid actuators. Each of the fluid controllers includes a valve for directing fluid selectively to one or the other of the two chambers of the fluid cylinder with which the controller is associated and for receiving fluid from the other chamber of each cylinder, and metering means for metering the flow of fluid to the chambers. The fluid controllers are operated by the vehicle operator turning a steering wheel or the like to effect steering.

The present invention does not include any cross plumbing between the unbalanced steering cylinders, and yet the system is structured so as to provide for the proper differential flow ratio to the cylinders to effect proper actuation of the steering cylinders.

BRIEF DESCRIPTION OF THE DRAWINGS

Other objects, features and advantages of the invention, its organization, construction, and operation will be best understood from the following detailed description of a preferred embodiment of the invention taken in conjunction with the accompanying drawings, in which:

FIG. 5 is an elevational view showing a driving connection between a pair of relatively movable members of the apparatus illustrated in FIG. 1, as viewed in the direction of the line V—V;

FIG. 6 is an elevational view similar to that of FIG. 5 showing means for providing relative axial movement of the two relatively movable members as viewed in the direction indicated by the line VI—VI in FIG. 1; and FIG. 7 is a schematic circuit representation of a hydrostatic steering system constructed in accordance with the present invention.

DESCRIPTION OF A PREFERRED EMBODIMENT

The present invention is embodied in hydrostatic steering system which utilizes fluid controllers for directing fluid to respective steering cylinders. The fluid controllers which are utilized in the system may be of a variety of constructions. FIGS. 1–6 illustrate a representative fluid controller 10 which may be used in the steering system. While the present invention is not limited to any specific controller construction, an understanding of the controller 10 will facilitate an understanding of the present invention.

Figure 2:
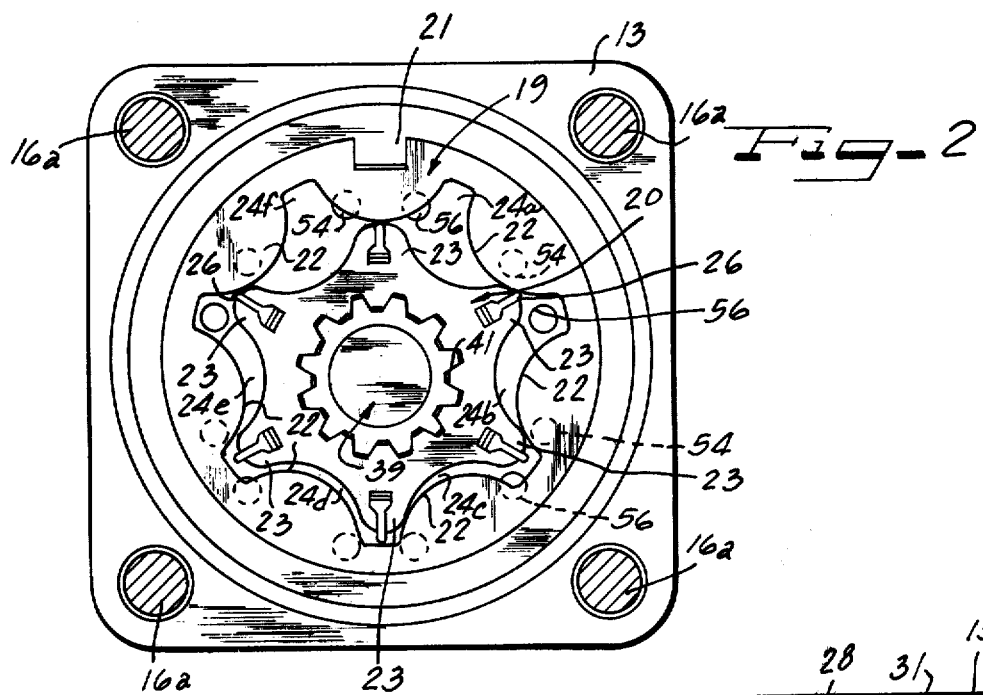
FIG. 2 is a transverse sectional view, taken generally along the line II—II of the apparatus illustrated in FIG. 1.
Figure 3:
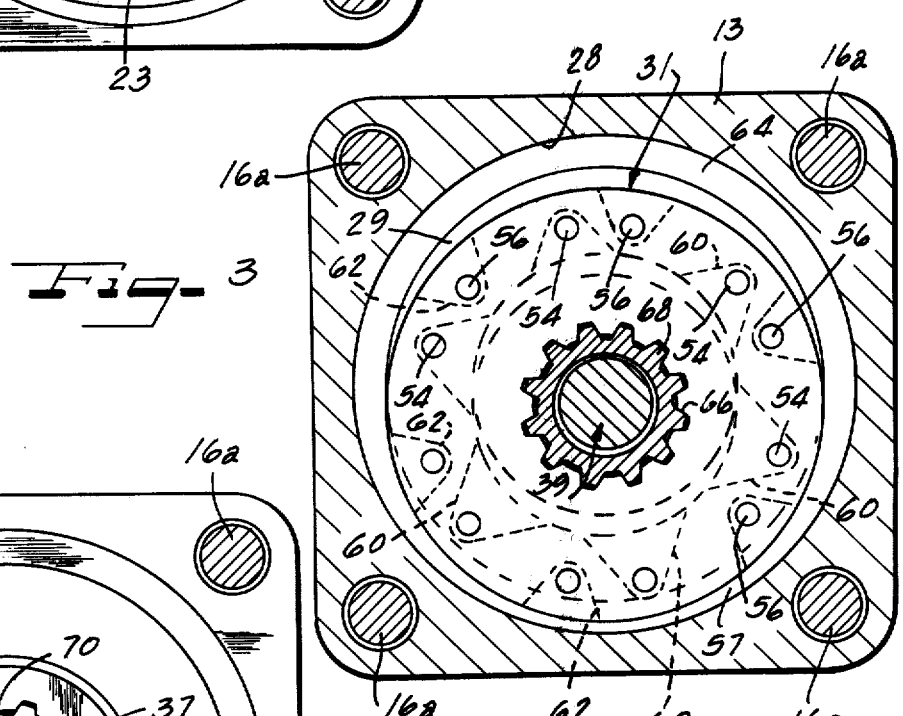
FIG. 3 is a transverse sectional view, taken generally along the line III—III of the apparatus illustrated in FIG. 1.
Figure 4:
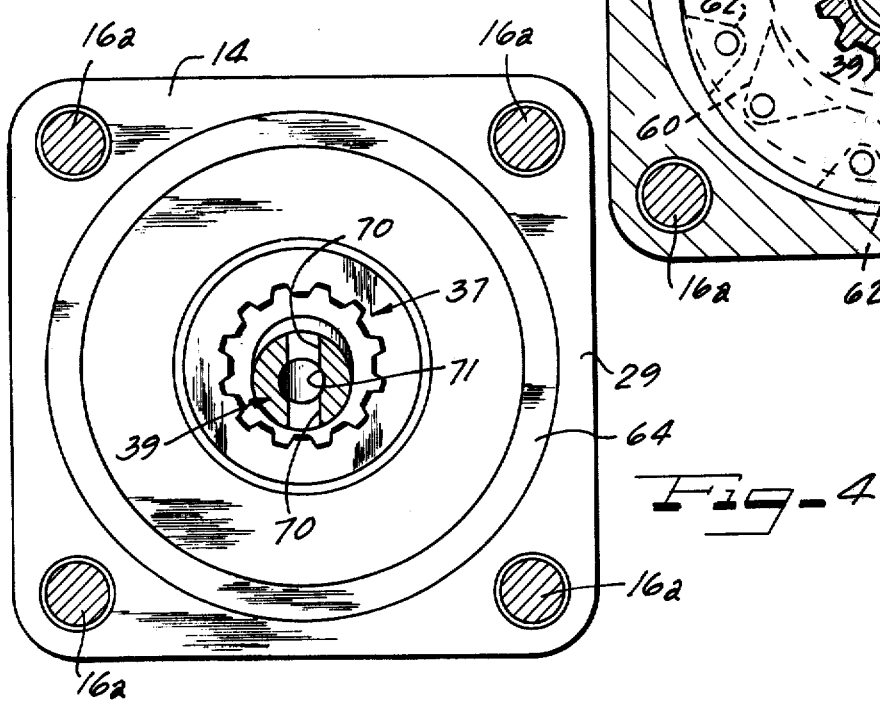
FIG. 4 is another transverse sectional view, taken generally along the line IV—IV of the apparatus illustrated in FIG. 1.

The fluid controller 10 comprises a housing 11 including essentially four sections, indicated respectively by the reference numerals 12, 13, 14 and 15. The housing sections 12–15 are clamped together in fixed assembly by virtue of a plurality of assembly bolts as indicated in FIGS. 2–4 at reference numerals 16a.

The section 12 closes off one end of the housing 11 and the section 15 closes the other end, but also serves to mount shaft 16. The shaft 16 is rotatably supported in the housing section 15 by virtue of a pair of bearing assemblies 17, 18 and the axis of rotation of the shaft 16 coincides with a longitudinal axis of te entire housing 11.

The housing section 13 is shaped substantially in the form of an annular ring and disposed within the axial confines thereof is a pair of fluid displacement gerotor gear members including a stator 19 and a rotor 20. The stator is keyed in a fixed relation with respect to the housing section 13, as indicated at 21, and comprises a series of internal lobes or teeth 22 (FIG. 2) which engage in meshing relation with a series of external lobes or teeth 23 formed on the rotor 20. In the fluid controller illustrated, the stator 19 has a total of seven teeth 22, whereas the rotor 20 has only 6 teeth 23.

In the controller illustrated in the drawings, the stator 19 is fixed, and consequently the rotor 20 will move both orbitally and rotationally relative to the stator upon operation of the controller 10, as is well known. A plurality of fluid pockets are formed between the teeth 22 of the stator 19 and the teeth 23 of the rotor 20, as indicated by the reference, characters 24a–24f. As the rotor 20 moves relative to the stator 19, the fluid pockets 24a–24f alternately expand and contract. Therefore, during any movement some of the fluid pockets are expanding, while others are contracting, as is well understood by those skilled in the art. A radially outwardly biased vane 26 is mounted on each of the rotor teeth 23 to reduce leakage between the adjacent fluid pockets.

In addition to providing a housing for the gerotor members 19, 20, the housing section 13 also has formed therein a radial wall 27 and a circumferential wall 28, which, in part and together with a radial wall 29 formed at one end of the housing section 13, provide a chamber 30 which houses a fluid commutator valve 31. The function of the commutator valve 31 is to direct fluid into an out of the expanding and contracting fluid pockets in timed relation to the relative orbital and rotational movement of the fluid displacement members 19, 20. The structure of the commutator valve 31 may vary and does not form a part of the present invention, and accordingly will not be described in detail.

A pair of fluid connection 32, 33 are formed in the housing 14 and communicate through suitable fluid circuitry with the commutator valve 31. When the fluid controller 10 is being utilized as a controller in a power steering system or the like, the fluid connection 32 may be connected to the discharge or high pressure side of a main power fluid pump, whereas the connection 33 may be coupled to the suction side of the pump or to the fluid reservoir located on the suction side of the pump, as illustrated in FIG. 7.

A pair of working cylinder fluid connections 34, 36 are also formed in the housing section 14. The working connections, or ports, 34, 36 may be coupled to the opposite ends of a hydraulic cylinder in a vehicular power steering system, as will be described hereinbelow.

In addition to the commutator valve 31, the illustrated hydraulic device 10 also includes a directional control fluid valve indicated generally at the reference numeral 37. The purpose of the valve 37 is to control the direction of fluid flow between the fluid connections 32, 33 and through the fluid displacement gerotor gear members 19, 20 and also to control the direction of flow into and out of the working ports 34, 36.

The directional control valve 37 is tubularly shaped and resides within a cylindrical bore in the housing section 14 formed by a bore wall 38 which is aligned axially with shaft 16 as well as with the stator 19. The valve 37 is coupled to the rotor 20 for joint rotation by means of an intermediate shaft part or wobble shaft 39 which is splined at an end 40 to the directional control valve 37 and at an opposite end 41 to the rotor 20. The valve 37 is also connected to the shaft 16 for relative axial and rotational motion.

Figure 1:
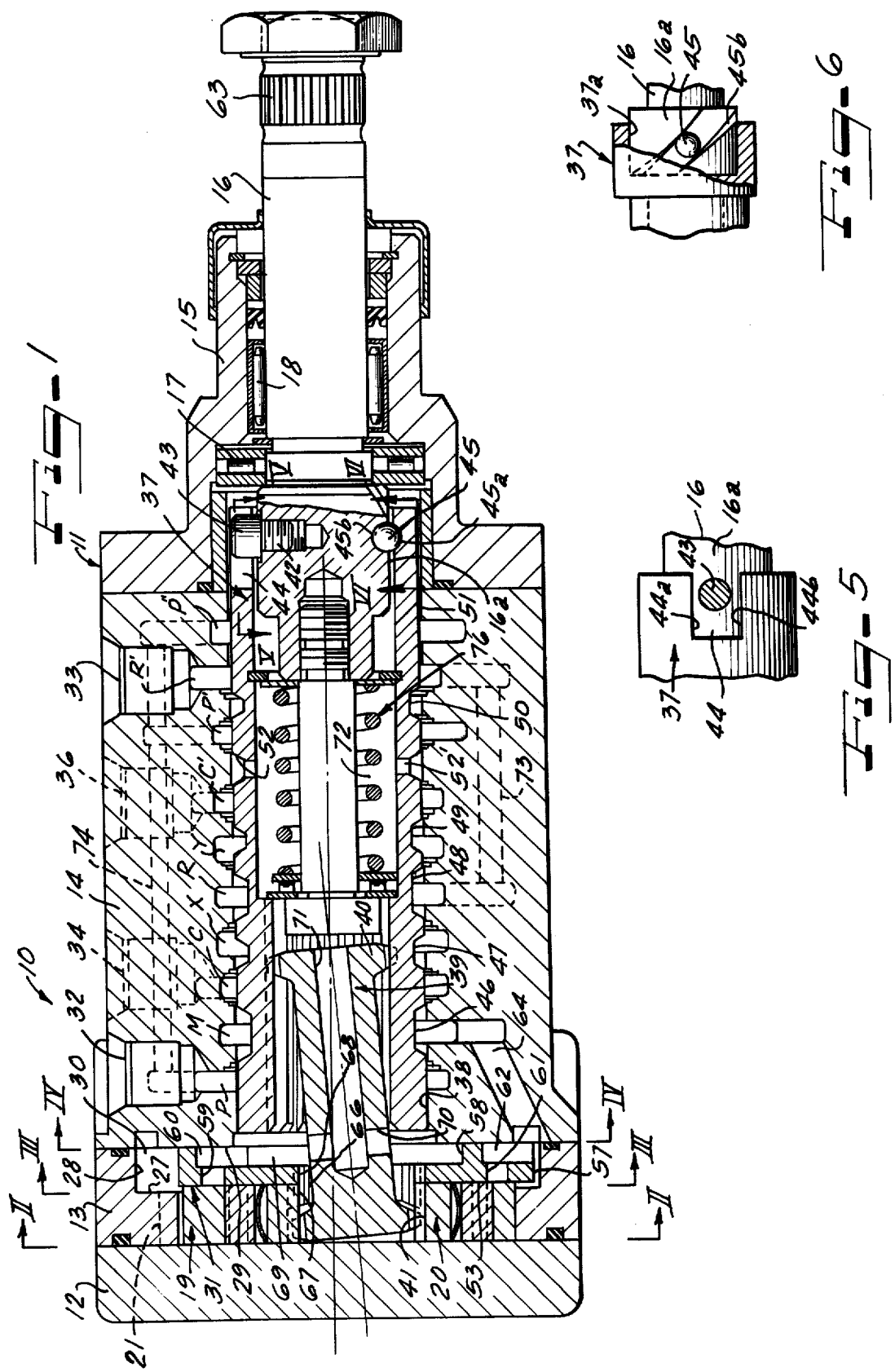
FIG. 1 is a sectional elevation of a fluid controller construction which may be employed in practicing the present invention.

Referring to FIGS. 1, 5 and 6, a threaded stud 42 is threaded radially into the shaft 16 and an enlarged head 43 thereof is disposed in an oversized slot 44 formed in the control valve 37. In addition, a ball 45 resides in a semispherical recess 45a formed in an inner wall 37a of the valve 37 and extends in a complementally shaped helical groove 45b formed in a circumferential wall 16a of the shaft 16.

As the shaft 16 is rotated relative to the valve 37, as would be the case when the shaft is coupled to a steering wheel or the like, the valve 37 shifts axially in a direction depending upon the direction of relative rotation as a consequence of the ball 45 riding in the helical groove 45b. However, in the event that the shaft 16 rotates relative to the valve 37 beyond a given degree, then the head 43 of the stud 42 will abut a sidewall 44a or 44b of the slot 44, whereupon further rotation of the shaft 16 will cause the valve 37 to be driven thereby.

In order to enable the control valve 37 to perform its directional control function, the bore wall 38 is provided with a series of grooves indicated respectively at P, M, C, X, R, Y, C', P', R' and P''. These grooves correspond with another series of grooves 46–50 formed in a peripheral wall 51 of the control valve 37 and a pair of radial passages or bores 52 and 52' which extend through the cylinder of the control valve 37. The function of the various grooves and passages identified above will be explained in detail below.

The commutator valve 31 is essentially disc-shaped and comprises a flat radial wall 53 which is aligned and in abutting engagement with the adjacent end walls of te stator 19 and the rotor 20. A plurality of ports are formed in the radial wall 53. These ports are grouped in pairs, one port of each pair being identified at a reference numeral 54 and the other port of each pair being identified at the reference numeral 56. The pair of ports are spaced radially angularly about the central axis of the commutator valve 31 and futhermore the ports 54, 56 of each pair are also mutually angularly spaced. There are six pairs of ports in this particular embodiment and thus the number of pairs corresponds to the number of teeth of the rotor 20. With respect to the rotor teeth, and as illustrated in FIG. 2, The port 54 is on one radial side of its respective rotor tooth, whereas the port 56 is on the opposite side. The circular pattern in which the ports 54, 56 are arranged has a diameter which corresponds substantially to the pitch diameter of the stator teeth 22 and is such that the ports are closed or sealed as they move into axial alignment with the stator teeth 22 and are unsealed or opened for fluid communication and move into axial alignment with the fluid pockets 24a-24f between the teeth of the stator 19.

The commutator valve 31 also comprises an outer peripherial wall 57 having a diameter which is less than the diameter of the adjacent cylindrical wall 28, and an inner peripherial wall 58. The ports 54 communicate with the inner peripherial wall 58 through a series of axial passages 59 and radial passages 60, whereas the ports 56 communicate with the outer peripheral wall 57 through axial passages 61 and radial passages 62. As a consequence, the chamber 30, in which the commutator valve 31 resides, is partitioned into two subchambers, one of which surrounds the commutator valve 31 and the other of which is formed within the commutator valve 31.

The operation of the controller 10 should be understood by those skilled in the art. Assuming that no torque is being applied to the shaft 16, the control valve 37 is axially disposed in a center or neutral position, the position thereof being illustrated in FIG. 1. In that position, the pressurized fluid from the discharge side of a power fluid pump is connected to the fluid connection 32 but is blocked off at the groove P by the valve 37.

Assume, however, that the shaft 16 is turned in a clockwise direction as by the operator turning the steering wheel connected with the shaft 16 or the like. Upon this movement, the valve 37 is shifted axially to the left, as viewed in FIG. 1. When the valve shifts axially, the pressure groove P communicates through a passage 46 with the meter groove M, and then communicates through a passage 64 formed in the housing section 14 with the chamber 30 in which the commutator valve 31 is housed. Pressurized fluid then flows through the passages 62, 61 to the ports 56, and the rotor 20 moves both orbitally and rotationally relative to the stator 19.

The commutator valve is connected for joint movement to the rotor 20 by means of a tubular coupling 66 which is splined at 67 to the rotor 20 and splined at 68 to the commutator valve 31. As the rotor 20 simultaneously orbits and rotates, the fluid pockets 24a—24f, which are then contracting, open to the ports 54 which correspond thereto. The fluid being delivered from the fluid pockets passes through the ports 54 and then through the passages 59, 60 and into the aperture 69 formed within the inner peripheral wall 58 of the commutator valve 31. The fluid then flows through the passages 70 formed in the wobble shaft 39 and on through a longitudinal passage 71 into a hollow portion 72 of the directional control valve 37. From the hollow portion 72 fluid flows through the radial passages 52 and 52' into the servomotor or working groove C', and then to the fluid connection 36 for flow therefrom to a suitable powered device. The fluid being expelled from the powered device is directed to the fluid connection 34 from which it flows into the groove C and then through the groove 47 into the pressure dam groove X. From the groove X, the fluid flows through the groove 48 and into the return or low pressure groove R, which communicates with the second low pressure groove R' by way of an internal passage 43 formed in the housing section 14. From the groove R', the fluid flows out of the fluid connection 33 (an output port).

When the steering shaft 16 is rotated in an opposite direction from that just assumed, the directional control valve 37 is shifted toward the right, as viewed in FIG. 1, to close off the high pressure groove, as shown. The second high pressure groove P', however, communicates with the groove P by way of an internal passage 74 formed in the housing section 14. Therefore, the groove P' is always under the same high pressure as the groove P. As the valve 37 shifts toward the right, the groove P' communicates through the radial passages 52, 52' into the hollow portion 72 of the control valve 37 from which it flows through the bore 71 of the wobble shaft 39 and into the aperture 69 of the commutator valve 31.

The flow path continues and the fluid flows through the passage 64 and into the meter groove M from which it flows by way of the groove 46 into the adjacent groove C. From the groove C, the pressurized fluid flows from the fluid connection 34 to a work cylinder. The fluid expelled from the work cylinder flows to the fluid connection 36 and the second groove C', from which it flows through the groove 49 and into the pressure dam groove Y, and then through the groove 48 into the low pressure groove R. From the groove R the fluid flows through the passageway 73 into the second low pressure groove R' and to the fluid outlet connection 33.

Upon termination of the turning torque on the shaft 16, the control valve 37 is biased to its neutral or "shut-off" position (the position shown in FIG. 1) by virtue of a spring arrangement indicated generally at the reference numeral 76. The spring arrangement 76 provides a neutral bias to the valve 37 regardless of the direction of axial shifting of the valve and the direction of rotation of the shaft 16.

As noted above, the fluid controller 10 is utilized in a steering system 100, shown schematically in FIG. 7, and which embodies the present invention. The steering system 100 comprises three fluid controllers 102, 160, 162, which may advantageously be of the type discussed above or which may be of any other suitable type. In addition, the steering system 100 comprises a pair of rotary fluid motors 134, 138 which may be of any suitable type.

The fluid controller 102 includes an input port 104, an output port 106, and a pair of input/output or working ports 108, 110. The input port 104 is connected to a fluid supply pump 114 which delivers a flow of fluid from a reservoir 116a to the controller 102 by way of a conduit 118. In the neutral position, the fluid passes out of the output port 106 and to a reservoir 116 by way of a conduit 120. The fluid pump 114 is a low power pump delivering, for example, 4–5 G.P.M. at 100–200 p.s.i., this delivery being generally low when compared to that of the two additional pumps 180 and 194 in the system, as will be discussed below.

The input controller 102 proportionally actuates the two secondary fluid motors 134, 138, as will be described in detail below. The fluid motor 134 includes an input/output port 132 which is connected to the working port 108 of the fluid controller 102 by way of a conduit 128, and the fluid motor 138 includes an input/output port 136 which is also connected to the working port 108 of the fluid of the fluid controller 102 by way of a conduit 130, here shown as a branch of the conduit 128. Similarly, the fluid motor 133 has an input/output port 146 which is connected to the working port 110 of the fluid controller 102 by way of a conduit 142, and the fluid motor 134 has an input/output port 144 which is connected to the working port 110 by way of a conduit 140, shown as a branch from the conduit 142. It will therefore be readily appreciated that the fluid motors 134, 138 are connected in a parallel fluid circuit across the working ports 108, 110 of the fluid controller 102.

The fluid motor 134 includes an output shaft 148 which is coupled to an input shaft 156 of the fluid controller 160. Likewise, the fluid motor 138 includes an output shaft 150 which is coupled by means of a coupler 154 to an input shaft 158 of the fluid controller 162.

The fluid controller 160 includes an input port 164, an output port 166 and a pair of working ports 168, 170, while the fluid controller 162 includes an input port 172, an output port 174 and a pair of working ports 176, 178. The fluid controllers 160 and 162 are high power fluid controllers and have fluid delivered thereto from the respective pumps 180, 194. The pumps 180, 194 deliver, for example, 30 G.P.M. The pump 180 draws fluid from the reservoir 116a and delivers the fluid by way of a conduit 182 to the input port 164 of the fluid controller 160. When in a neutral position, the controller 160 passes the fluid back to the reservoir 116a by way of the output ports 166 and a conduit 184. The pump 194 draws fluid from the reservoir 116 and delivers the same to the input port 172 of the fluid controller 162 by way of a conduit 192.

The fluid controllers 160, 162 are connected to respective actuators, more specifically, to respective hydraulic cylinders 208, 224. The cylinder 208 includes a pair of input/output ports 206, 218 located on respective sides of a piston 212 in a cylinder housing 210. The input/output ports 206, 218 are respectively connected to the working ports 168, 170 by way of respective conduits 204, 216. The fluid actuator 224 includes a cylinder housing 226 which has a pair of input/output ports 222, 234 on respective sides of a piston 228. The input/output ports 222, 234 are respectively connected via a pair of conduits 220, 232 to the working ports 176, 178 of the fluid controller 162. The piston 212 carries an extensible member, or piston rod 214, and the piston 228 carries a piston rod 230, these piston rods being linked by a member 236 for actuating vehicle steering through known linkage, not shown.

The cylinders 208, 224 may be termed unbalanced cylinders in that the chambers on the opposite sides of the pistons 212, 228, respectively, have different volumes. The ports 218, 222, of course, are connected with the head end of these cylinders and to the chambers in the cylinders having the higher volume. Since the volume of these chambers vary, the system is designed to provide variable flow rates thereto to effect steering.

Each of the pumps 114, 180 and 194 are provided with safety relief valves 122, 188 and 198, respectively. The relief valve 122 is connected by way of a conduit 124 to the high pressure side of the pump 114 by way of the conduit 118 and schematically includes a "pilot" passage 126 (which may be an internal valve passage, as is well known in the art) for opening the valve in response to a predetermined pressure. The valve 188 is connected to the high pressure side of the pump 180 by way of conduit 186 and includes a pilot passage 190 for opening the valve in response to pressure above a predetermined level. Likewise, the valve 198 is connected to the high pressure side of the pump 194 by way of a conduit 200 and includes a pilot passage 202 for actuating the valve in response to a predetermined pressure.

The hydrostatic control system shown in FIG. 7 operates as follows. Assuming first a neutral condition with the vehicle or other control device in a steady-state condition, fluid is delivered from the pumps to the respective controllers and to the reservoirs 116, 116a. If, however, a steering wheel or the like rotates the shaft 112 of the controller 102 in the direction indicated by the arrow to effect a positive fluid displacement so that the fluid exits the working port 108, the fluid motors 134, 138 will have fluid delivered thereto by way of the conduits 128, 130, respectively, and returned to the working port 110 by way of the conduits 140, 142, respectively. The fluid motors 134, 138 will rotate in the directions indicated by the arrows to in turn operate the fluid controllers 160, 162.

Assuming that the direction of turning of the input shafts 156, 158 effects a fluid circuit in which the fluid exits the working ports 168, 176, the piston 212 and the piston 228 will be urged toward the right in FIG. 7, and the return fluid is delivered to the working ports 170, 178 for return by way of the output ports 166, 174 to the reservoirs 116, 116a. The fluid which exits from the working port 168 flows into the low volume chamber of the hydraulic cylinder 208, while the fluid which flows from the exit port 176 flows into the high volume chamber of the hydraulic cylinder 224. This differential flow rate is provided by differential actuation of the hydraulic motors 134, 138. Since inherently fluid flows to the point of least resistance, these motors will inherently be actuated by different flow rates from the controller 102. In the case being assumed, the fluid motor 138 will be actuated at a more rapid rate than will the fluid motor 134, and thus the fluid motor 138 will produce a greater flow which is communicated to the large volume chamber of the hydraulic motor 224, while the fluid motor 134 produces a lower volume flow from the controller 160 which is communicated to the lower volume chamber of the hydraulic acutator 208.

Inasmuch as the fluid controllers 102, 160 and 162 are positive fluid displacement devices which meter a certain amount of fluid to a working port in response to movement of the respective input shaft, the motion of the fluid actuators 208, 224 follows the motion of the input shaft 112 of the fluid controller 102. When the shaft stops turning, the actuators stop moving.

Rotation of the shaft 112 in the opposite direction, of course, finds a similar opposite response by the components of the hydrostatic control system. On rotation of the shaft 112 in the opposite direction, again the fluid motors 134, 138 will be differentially actuated in order to provide a differential output flow to the unbalanced cylinders 208, 224. In this case, the flow from the output port 170, which is directed to the larger volume chamber of the hydraulic controller 208, will be substantially greater than the output flow from the output port 178 of the hydraulic controller 162, which is directed to the lower volume chamber of the hydraulic cylinder 224.

It should be apparent from the above that the steering system illustrated in FIG. 7 in effect comprises two separate fluid systems, each of which includes one of the cylinders 208, 224. During normal steering, each fluid system is operated upon turning of the shaft 112 to effect simultaneous actuation of those cylinders to effect vehicle steering. It should be further apparent, however, that in the event one of the steering systems is rendered inoperative, due to certain events, the vehicle can still be steered by turning of the shaft 112, which would effect actuation of the still operative fluid system. Also, in the event of failure of all of the supply pumps in the system, manually turning of the shaft 112 will cause the gerotor mechanisms in controllers 102, 160, 162 to act as pumps and thereby actuate the cylinders 208, 224 to effect steering.

Having described the invention, what is claimed is:

1. A vehicle steering system comprising,
   two independent vehicle steering systems which when actuated either together or individually will effect vehicle steering, each of said steering systems including,
   a steering cylinder connected to effect vehicle steering upon actuation thereof,
   a metering mechanism for metering fluid flow to said steering cylinder, and
   a valve for directing that flow to said steering cylinder, and
   means for operating each system upon operator actuation thereof,
   said metering mechanism and said valve for each system comprising parts of a fluid controller having an input shaft which when turned effects actuation of said valve and said metering mechanism,
   said means for operating said systems comprising means for effecting rotation of said input shaft of each of said fluid controllers, and
   said means for effecting rotation of said input shaft comprising a fluid motor connected with the shaft and a mechanism operated upon turning of the vehicle steering wheel for actuating said fluid motor.

2. A vehicle steering system as defined in claim 1 wherein said mechanism comprises a gerotor metering mechanism and a valve for porting fluid to said fluid motors.

3. A vehicle steering system comprising,
   two independent vehicle steering systems which when actuated either together or individually will effect vehicle steering, each of said steering systems including,
   a steering cylinder connected to effect vehicle steering upon actuation thereof,
   a metering mechanism for metering fluid flow to said steering cylinder, and
   a valve for directing the metered flow to said steering cylinder, and
   means for operating each system upon operator actuation thereof,
   each of said steering cylinders comprising an unbalanced cylinder having a pair of chambers of different volumes,
   conduits associated with said metering mechanisms for directing fluid into the higher volume chamber of one cylinder and the lower volume chamber of the other cylinder to effect steering in one direction, and
   said vehicle steering system including means for providing different fluid flow rates from said metering mechanisms to said higher and lower volume chambers to effect steering in said one direction.

4. A vehicle steering system comprising,
   a pair of fluid actuators connected to effect turning of wheels of a vehicle when actuated,
   each of said actuators being divided into two fluid chambers of high and low volume, conduits for directing fluid flow into the high volume chamber of one actuator and the low volume chamber of the other actuator for effecting steering in one direction and conduits for directing fluid flow into the low volume chamber of said one actuator and into the high volume chamber of the other actuator for effecting steering in the opposite direction, and
   means for effecting differential fluid flow into said high and low volume chambers to effect steering in a given direction including respective fluid controllers associated with each of said fluid actuators, each of said respective fluid controllers comprising,
   a valve for directing fluid selectively to one or the other of the two chambers of the fluid actuator with which said controller is associated and for receiving fluid from the other chamber of its associated fluid actuator, and
   metering means for metering the flow of fluid to said chambers.

5. A vehicle steering system as defined in claim 4 wherein said means for effecting said differential fluid flows includes means for differentially actuating said fluid controllers.

6. A vehicle steering system as defined in claim 4 wherein each of said fluid controllers has an input shaft which when turned effects actuation of said valve and metering mechanism.

7. A vehicle steering system as defined in claim 4 further including means for effecting rotation of said input shafts including a fluid motor connected with each of said shafts to effect rotation thereof and an operator-actuated fluid controller for actuating said fluid motors, said operator-actuated controller comprising a valve and a metering mechanism for directing flow to each of said fluid motors, said fluid motors being connected in parallel across said operator-actuated fluid controller.

8. A vehicle steering system comprising,
   a first fluid controller including an input shaft for connection to the steering wheel of a vehicle and a metering valve mechanism connected to said input shaft for providing a metered flow of fluid at a first flow rate in response to rotation of said input shaft,
   first and second fluid motors each having an output shaft, said first and second motors connected in fluid communication with said metering valve mechanism of said first fluid controller and operable to provide rotation of their respective output shafts in response to metered flow of fluid supplied thereto,
   second and third fluid controllers each including an input shaft connected to a respective output shaft of said first and second motors and a metering valve mechanism connected to the respective input shaft for providing respective metered flows of fluid at a second flow rate in reponse to movement of the respective input shaft, and
   third and fourth motors each including a movable output member for connection to the steered wheels of vehicle, said third and fourth motors each including movable fluid-operated means connected to its output member and connected in fluid communication with and operated by a respective one of said second and third fluid controllers.

9. A vehicle steering system according to claim 8, a first source of fluid connected to said first fluid controller and operable to deliver fluid at a first flow rate,
a second source of fluid connected to said second fluid controller and operable to deliver fluid at a second fluid flow rate, and
a third source of fluid connected to said third fluid controller and operable to deliver fluid at said second flow rate.

10. A vehicle steering system according to claim 8 wherein said first and second fluid motors are connected in a parallel fluid communication with said first fluid controller.

11. A vehicle steering system according to claim 8 wherein said third and fourth fluid motors each include fluid-operated cylinders each having a piston which carries the respective output member.

12. A vehicle steering system according to claim 8 further including a link connecting said output members of said third and fourth fluid motors.

13. A vehicle steering system comprising,
two independent vehicle steering systems which when actuated either together or individually will effect vehicle steering, each of said steering systems including,
a steering cylinder connected to effect vehicle steering upon actuation thereof,
a metering mechanism for metering fluid flow to the cylinder,
a valve for directing fluid flow to the metering mechanism and from the metering mechanism to the cylinder,
a housing containing said metering mechanism and said valve,
said valve having a valve part movable from a neutral position to at least one actuated position,
a rotatable input shaft,
means interconnecting said input shaft and said valve part to effect movement of said valve part to an actuated position upon rotation of said input shaft, and
means interconnecting said metering mechanism and said valve part resulting in rotation of said valve part upon operation of said metering unit, and
means for operating each system upon operator actuation thereof.

* * * * *